Oct. 14, 1941.    R. DAUB    2,259,102
INTERNAL COMBUSTION ENGINE
Filed June 10, 1939    2 Sheets-Sheet 2
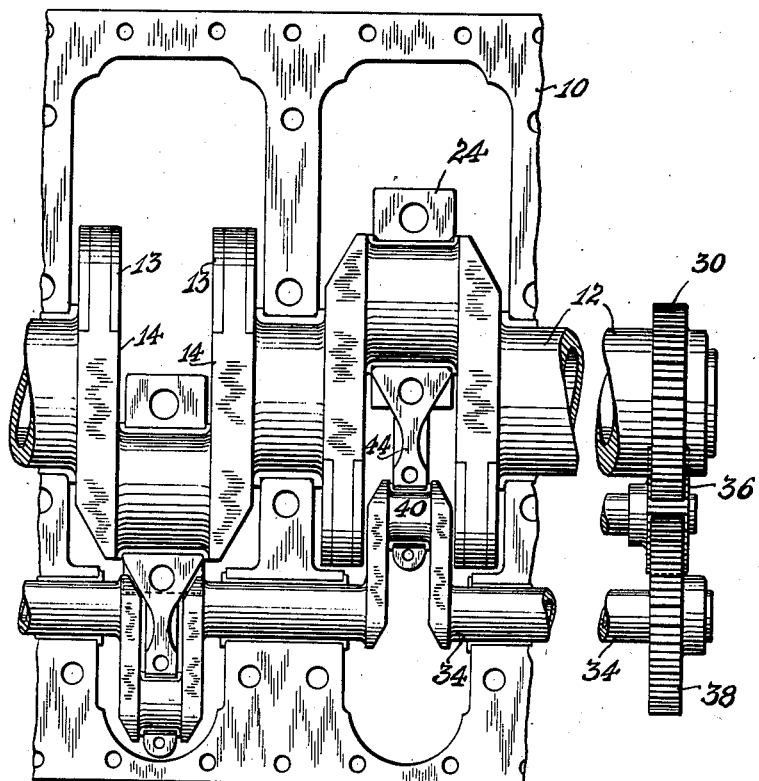
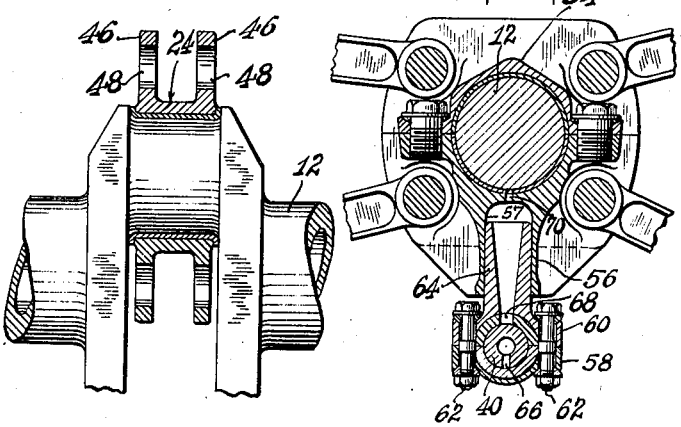
INVENTOR
RUDOLPH DAUB
BY
ATTORNEY Patented Oct. 14, 1941

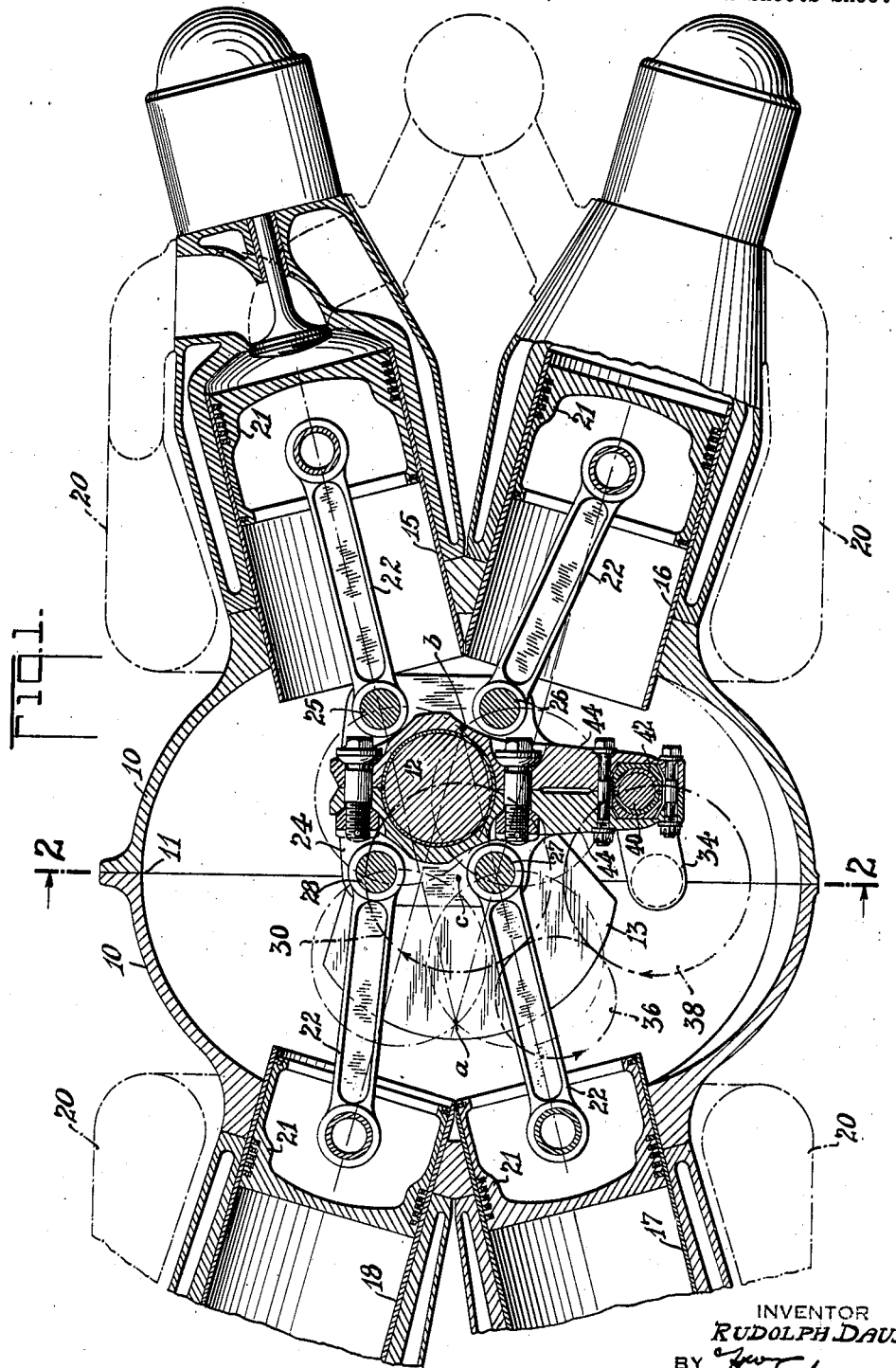

2,259,102

UNITED STATES PATENT OFFICE 2,259,102

INTERNAL COMBUSTION ENGINE

Rudolph Daub, Paterson, N. J., assignor to Wright Aeronautical Corporation, a corporation of New York Application June 10, 1939, Serial No. 278,390

5 Claims. (Cl. 74—44)

This invention relates to internal combustion engines and has for a primary object a provision of engine design features to allow of the construction of a multi-cylinder engine having very small overall height. The engine herein disclosed is adapted primarily for use in aircraft wing installations. The wings of the present day large aircraft are of sufficient depth to house the so-called "flat" engines in which in-line cylinders are disposed on opposite sides of a crankshaft, the crankshaft projecting through the wing leading edge to carry a propeller. In such flat engines, the height of the crankcase is the limiting factor while the actual height, or rather thickness of the cylinder banks is substantially less than that on the crankcase. There is a certain wastage of space in the flat engine and since more power from engine units is required it is an object of this invention to include second banks of cylinders on the sides of the crankcase so arranged as to provide greatly increased engine power without increasing the overall height of the engine.

A further object is to provide a novel cylinder arrangement in an internal combustion engine, and further, to provide a novel arrangement of connecting rod and crankshaft bearing units which secure a "true motion" path of travel for the pistons and rods in each bank of cylinders. Still another object is to provide a novel form of master bearing spool on a crankshaft to which a plurality of connecting rods are articulated, said spool being stabilized against rotation by an auxiliary crankshaft rotating in synchronism with the main crankshaft. Further objects will become apparent in reading the annexed detailed description, in which Fig. 1 is a transverse section through a multicylinder engine unit;

Fig. 2 is a section on the line 2—2 of Fig. 1;

Fig. 3 is an elevation of a crankthrow carrying a bearing spool, and

Fig. 4 is a section through an alternative arrangement of bearing spool.

The engine comprises a crankcase 10 split on its vertical center line as at 11 and carrying a crankshaft 12 having suitable counterweights 13 on the crankcheeks 14 thereof. The engine may comprise two or more longitudinal series of cylinders, according to Fig. 2, while each longitudinal series, or bank, comprises four cylinders 15, 16 and 17, 18 as shown in Fig. 1. The cylinders are arranged in opposed pairs each pair comprising cylinder pairs 15, 16 and 17, 18 each pair arranged in a V whereby the cylinder axes intersect at points such as $a$ and $b$ respectively on opposite sides of the center $c$ of the crankshaft from the cylinders. The angle between the axes of each pair of cylinders is somewhat less than 45° so that the overall height of the cylinder pair with the auxiliary parts such as manifolds 20 is no greater than the overall height at the center of the crankcase 10. By this compact arrangement twice as many cylinders are placed on each crank throw of the crankshaft than were previously used in connection with the flat type engines above referred to.

The pistons 21 of the respective cylinders carry connecting rods 22 articulated to a crankpin bearing spool 24 on knuckle pins 25, 26, 27 and 28 corresponding to the cylinders 15 to 18 inclusive. The several knuckle pins are so disposed around the spool 24, that, as the crankshaft rotates, the angulation of each connecting rod on either side of its cylinder axis will be the same. To attain this objective, the bearing spool 24 is constrained from rotation but travels in a circular orbit defined by the crankpin, the path of travel of the crankpin center being indicated by the heavy dot-dash line 30 which also represents the pitch circle of the gear 30 shown in Fig. 2. Accordingly, each knuckle pin center will have a circular orbit as shown by the light dot-dash circles passing through the centers of respective knuckle pins.

The structure for providing the orbital movement of the spool 24 comprises an auxiliary crankshaft 34 geared to rotate with the main crankshaft 12 through an idler 36 and a gear 38 similar in size to the gear 30. The crankpin 40 of the auxiliary crankshaft 34 is relatively short so that said pin with its crankcheeks may pass between the crankcheeks 14 of the main crankshaft, and the crankpin 40 carries a bearing block 42 vertically slidable in arms 44 extending from the bottom of the spool 24. The two crankpins are so related by the gears 36, 38 as to maintain the same phase relation and the block 42 slidable in the arms 44 is so arranged to compensate for deflections in the engine structure due to operating loads, whereby only lateral stabilizing stresses are carried by the crankpin 40. The spool 24 as shown may be made in opposite similar halves bolted together around the respective crankpins and in operation the spool 24 in any position is parallel to itself in any other position.

The spool 24 with its stabilizing means functions, in a sense, as a master connecting rod but functionally goes a step beyond the conventional radial engine master connecting rod in that it endows the several knuckle pins 25 to 28 with true circular paths. As shown in Fig. 3 the spool 24 comprises integral side plates 46 provided with openings 48 for the knuckle pins, the connecting rods 22 being embraced by the plates 46.

In Fig. 4 I show an alternative form of spool stabilizing system in which the spool per se is indicated as 54, the bottom end thereof being formed as a cylindrical box 56 provided with a bore 57. Upon the auxiliary crankpin 40 a bearing unit comprising a cap 58 and a member 60 is clamped by bolts 62, the element 60 having a plunger 64 extending therefrom for telescopic sliding engagement with the cylinder 56. This arrangement may be utilized in the lubricating system for the crankshaft, the crankshaft 34 serving as an oil header, each crankpin 40 having a hole 66 registrable at every revolution with a hole 68 through the plunger 64. A hole 70 is formed in the bearing shell of the spool 54. With the slight telescopic action of the elements 56 and 64 an oil pump is established which intermittently feeds oils from the crankpin 40 to the main crankshaft 12. To augment the pumping action, the throws of the crankshafts 12 and 34 may have a differential of about $\frac{1}{16}''$ by which a definite pumping stroke is established between the cylinder 56 and the plunger 64. Such small difference in crank throw will have little effect upon the proper stabilization of the bearing spool 54.

Longitudinally of the engine, as in Fig. 2, there may be any convenient number of crank throws with a set of four cylinders corresponding thereto. For instance, if a six throw crankshaft be utilized, a 24 cylinder engine would result which could readily be incorporated within the wing of a moderate size aircraft to fulfill one of the objectives of the invention previously expressed.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

I claim as my invention:

1. In an engine having a crankshaft including a crankpin, a bearing spool on the crankpin, a plurality of connecting rods journalled thereto, an auxiliary crankshaft parallel to the first having a crankpin of similar throw but of such length as to pass between the crankcheeks of the first crankshaft, an extension slidably carried on the spool and journalled on said auxiliary crankpin, and gearing between said crankshafts holding the crankpins in the same phase relation during shaft rotation.

2. In an engine, parallel crankshafts geared to rotate together, the crankpins thereof having similar paths of travel and being in similar phase relation with one another, a bridge member having portions journalled on a corresponding crankpin of each shaft whereby the member follows an orbital path without rotation during crankshaft rotation, means connecting said portions for relative displacement along a line connecting the two crankpin centers, cylinders spaced around said crankshafts, pistons in said cylinders, and connecting rods articulated to respective pistons and to one portion of said bridge member.

3. In an engine, parallel crankshafts of substantially similar throw, one comprising a main shaft and the other an auxiliary shaft, means gearing said shafts for joint rotation in the same direction, a main spool on the main crankpin having knuckle pins therearound for engagement by connecting rods of the engine cylinders, and an auxiliary spool on the auxiliary shaft crankpin, said spools each having rigid therewith inter-engaging elements of a telescopic joint to allow of change in the distance between the pin centers, engagement of said elements serving to constrain said spools to orbital movement without rotation upon synchronous rotation of the crankshafts.

4. In an engine, a main crankshaft, cylinders oppositely disposed relative thereto, pistons in said cylinders, a bearing spool on the shaft crankpin, connecting rods articulated to said pistons and to said bearing spool, a second crankshaft parallel to the first and geared to rotate therewith, a bearing engaging the crankpin of said auxiliary shaft, and a slidable connection between said bearing and said spool arranged to constrain the two latter to orbital movement with the crankpins, without rotation and to allow of change in the distance between centers of the crankpins.

5. In an engine, a main crankshaft, cylinders oppositely disposed relative thereto, pistons in said cylinders, a bearing spool on the shaft crankpin, connecting rods articulated to said pistons and to said bearing spool, a second crankshaft parallel to the first and geared to rotate therewith, a bearing engaging the crankpin of said auxiliary shaft, and an axially slidable connection between said bearing and said spool arranged to constrain the two latter to orbital movement with the crankpins, without rotation, said crankpins having a differential throw, and the slidable connection between bearing and spool comprising a plunger engaging a cylinder to comprise a fluid pump; and fluid inlet and outlet connections from said cylinder to respective crankpins.

RUDOLPH DAUB.